United States Patent [19]
Eckendorff

[11] Patent Number: 6,135,664
[45] Date of Patent: Oct. 24, 2000

[54] ADJUSTABLE COUPLING DEVICE

[75] Inventor: Jean-Pierre Eckendorff, Saint-Sebastien-de-Morsent, France

[73] Assignee: Societe de Recherches, d'Etudes et de Valorisation, Claville, France

[21] Appl. No.: 08/973,238

[22] PCT Filed: Jun. 11, 1996

[86] PCT No.: PCT/FR96/00880

§ 371 Date: Dec. 4, 1997

§ 102(e) Date: Dec. 4, 1997

[87] PCT Pub. No.: WO96/41963

PCT Pub. Date: Dec. 27, 1996

[30] Foreign Application Priority Data

Jun. 12, 1995 [FR] France .................................. 95 06895

[51] Int. Cl.$^7$ ...................................................... F16B 2/14
[52] U.S. Cl. ...................... 403/13; 403/359.1; 403/374.4
[58] Field of Search ................. 403/13, 14, 256, 403/258, 260, 373, 374.4, 374.3, 359.1, 359.6; 74/552, 452, 493

[56] References Cited

U.S. PATENT DOCUMENTS

| 1,903,162 | 3/1933 | Baur et al. . | |
|---|---|---|---|
| 4,624,596 | 11/1986 | Eckendorff | 403/374.4 X |
| 4,668,116 | 5/1987 | Ito | 403/258 |
| 5,090,365 | 2/1992 | Hotta et al. . | |
| 5,094,117 | 3/1992 | Mikel et al. | 403/258 X |
| 5,141,090 | 8/1992 | Trojan . | |
| 5,176,043 | 1/1993 | Eckendorff | 74/552 |
| 5,308,183 | 5/1994 | Stegeman et al. | 403/258 X |
| 5,356,236 | 10/1994 | Duboue | 403/13 X |

FOREIGN PATENT DOCUMENTS

| 900 505 | 12/1953 | Germany . |
| WO 89/12179 | 12/1989 | WIPO . |

*Primary Examiner*—Harry C. Kim
*Attorney, Agent, or Firm*—Young & Thompson

[57] ABSTRACT

A coupling device for placing at one end of a shaft (21), comprising a hub (40) to be mounted on and axially locked relative to the shaft (21), the shaft (21) being surrounded by a hollow cylinder (34). The hollow cylinder (34) and the shaft (21) are locked in their relative adjusted angular positions by a locking washer (70) held against the front surface (35) of the hollow cylinder (34) by a locking screw (61) centered on the axis (20) of the shaft (21) axially holding the hollow cylinder (34) against the hub (40), the device being preassembled to form a sub-assembly.

28 Claims, 4 Drawing Sheets

ADJUSTABLE COUPLING DEVICE

CROSS REFERENCE TO RELATED APPLICATION

This is the 35 USC 371 national stage of international application PCT/FR96/00880 filed on Jun. 11, 1996 which designated the United States of America.

FIELD OF THE INVENTION

The present invention concerns a device for coupling a hollow cylinder to a shaft, designed to be mounted at the end of said shaft, the relative angular position of the cylinder and of the shaft being adjustable.

BACKGROUND OF THE INVENTION

A device of this kind is of the type described in document EP-A-0 148 794. The device of the above document is satisfactory but the device is generally mounted on a shaft that is adapted to receive it and it is not always easy to mount it, its components parts having to be mounted one after the other.

SUMMARY OF THE INVENTION

An aim of the present invention is to propose a device of the above kind adapted to be mounted at the end of an existing shaft and which additionally constitutes a subassembly that is easy to mount at the end of said shaft, in the manner of a pulley-wheel, for example.

In accordance with the invention, a device for coupling to a shaft adapted to be placed at the end of said shaft, includes a hub adapted to be mounted on and keyed axially to said shaft, said shaft being surrounded by a hollow cylinder, locking in their adjusted relative angular position of the hollow cylinder and the shaft being assured by a retaining washer pressed against the front face of the hollow cylinder by means of a retaining screw centered on the axis of the shaft pressing the hollow cylinder axially against the hub, an annular ring centered on the axis of the shaft being surrounded by the hollow cylinder and movable axially, being adapted, during said axial movement to adjust the relative angular position of the hollow cylinder and the shaft, the device being pre-assembled to constitute a subassembly.

Advantageously, the device is pre-assembled by means of a bracket; the bracket is axial; the bracket is transversal; alternatively, the device is pre-assembled by means of a nut adapted to be cut easily cooperating with the thread of the retaining screw.

Advantageously, the annular ring has longitudinal splines on its inside surface whereby it can be constrained to rotate with said shaft whilst being movable axially and at least one tooth with helical flanks on its outside surface, said hollow cylinder having at least one spline recessed into its inside surface and adapted to receive said at least one tooth of the annular ring, the flanks of said spline being helical and in corresponding relationship with the helical flanks of said at least one tooth of the annular ring.

Alternatively, the annular ring has helical splines on its inside surface whereby it can be constrained to rotate with said shaft whilst being movable axially and at least one tooth with straight or reverse pitch flanks on its outside surface, said hollow cylinder having at least one spline recessed into its inside surface adapted to receive said at least one tooth of the annular ring, the flanks of said spline being straight or of reverse pitch and in corresponding relationship with the straight or reverse pitch flanks of said at least one tooth of the annular ring.

Advantageously, the device is pre-assembled by the retaining screw.

Alternatively, the annular ring has on one side, i.e. on its inside surface or on its outside surface, longitudinal splines and, on the other side, at least one tooth with helical flanks, said hollow cylinder or said hub having at least one spline adapted to receive said at least one tooth of the annular ring, the flanks of said spline being helical and in corresponding relationship with the helical flanks of said at least one tooth of the annular ring, said longitudinal splines enabling the annular ring to be mounted on the part, either the hollow cylinder or the hub, that does not include said at least one spline but instead longitudinal splines complementary with the longitudinal splines of the annular ring.

Advantageously, said hub is also locked to the shaft in a predetermined angular position so as to rotate with the shaft; the axial locking of the hub is obtained by means of a bearing surface on the shaft having splines that extend the splines of the shaft and that cooperate with corresponding splines of the hub likewise extending its splines.

Preferably, for the axial displacement of the annular ring, an annular drive screw carries a helical thread which cooperates with a helical thread on the portion of the surface of the part without the splines, either the hollow cylinder or the hub, that carries the at least one spline, said annular ring being coupled in translation to said annular drive screw; a transverse abutment limits the axial travel of the annular screw; the annular screw is slit and its thread is advantageously a single thread starting from one side of said slit and ending at the other side; the annular screw is preferably braked; this is achieved by the use of an annular screw that is not rigorously circular at rest but deformed radially and mounted elastically, for example.

Preferably there is a plurality of teeth with helical flanks, polarizer means being provided for correct mounting of the device on the shaft.

Advantageously the ends of the threaded areas are circumferentially in line with or at a distance from the helical flanks of the rim on a radius at least equal to the radius of the thread root; said ends are inclined to said flanks, a radius being provided at the root of the teeth.

Preferably, the hub is mounted on a conical part of the shaft by means of a key the edge of which is parallel to the generatrix of said conical part, the bottom of the key slot having a part parallel to the axis of the shaft followed by a part parallel to said generatrix.

Advantageously, the hub has at least one radial lug with a thread to receive a screw passing through a circumferential opening in the rim.

Preferably, the retaining washer is slightly conical when at rest and plane after clamping.

Alternatively, the retaining washer is plane when at rest and slightly conical after clamping, the front face of the hollow cylinder being also slightly conical.

Advantageously, the retaining washer has at least one opening for an adjuster tool.

To increase the driving torque transmitted via the bearing face of the hollow cylinder to the hub, the surfaces of the parts in contact are preferably coated with a friction material; alternatively, a brake disc is disposed between the parts.

In one application of the invention, the cylinder is carried by the drive unit of a windshield wiper arm.

In another application, the hollow cylinder is carried by the rim of a pulley-wheel; the at least one tooth with helical flanks of the annular ring is at the start of adjustment in the position corresponding to the maximum angular lag of the shaft, the helical flanks of the hollow cylinder have a lefthand thread and the annular screw having a righthand thread.

BRIEF DESCRIPTION OF THE DRAWINGS

The features and advantages of the invention will become more apparent from a reading of the following description with reference to the accompanying drawings, in which.

DESCRIPTION OF THE PREFERRED EMBODIMENTS

The coupling device of the invention has many and varied applications, in particular in the automobile industry.

Take the case of an automobile vehicle windshield wiper, for example: the windshield wiper blade is carried by a windshield wiper arm that reciprocates; to be more precise, the arm is pivoted to a drive unit attached to the end of a drive shaft, a spring disposed between the arm and the drive unit pressing the wiper onto the windshield; for fastening the drive unit to the drive shaft, the latter has a splined portion, generally conical, extended by a screwthreaded shaft end; the splined portion receives the drive unit, which incorporates a corresponding bore, and a nut is screwed onto the screwthreaded end of the shaft; after the nut is tightened the splines on the splined portion are embedded in the drive unit to fasten the drive unit rotationally to the drive shaft.

The angular position of the drive unit relative to the drive shaft determines the sweep of the wiper on the windshield; the drive unit must therefore be positioned correctly; this is not easily achieved; furthermore, if it is not right on the first attempt, it is even more difficult thereafter because the bore in the drive unit has been marked by the splines on the drive shaft.

The coupling device of the invention overcomes these drawbacks.

Figure 1:
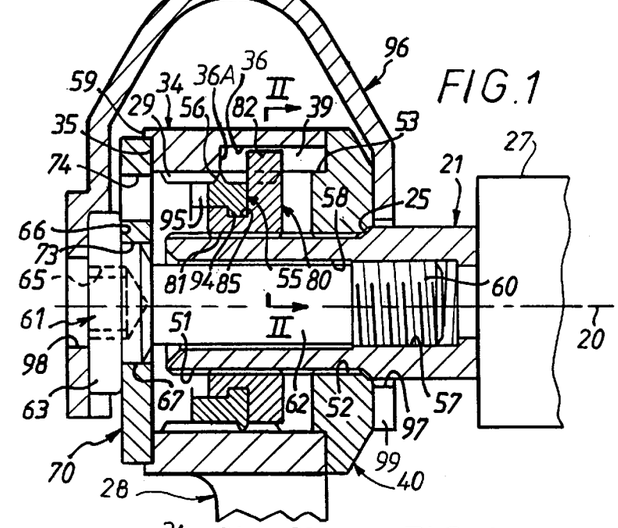
FIG. 1 is a view in axial section of a device in accordance with the invention mounted at the end of a shaft before adjustment and equipped with a mounting bracket.
Figure 2:
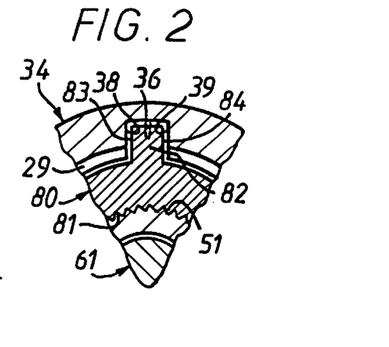
FIG. 2 is a fragmentary view in cross-section taken along the line II—II in FIG. 1.
Figure 3:
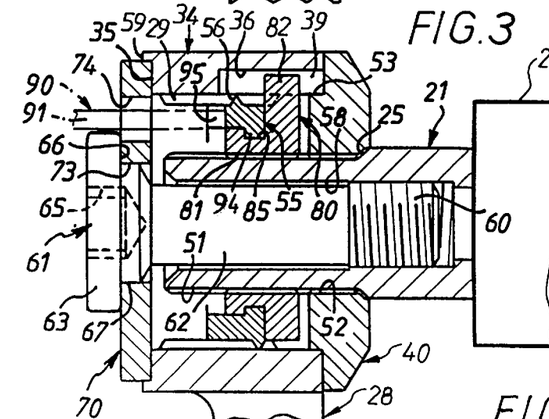
FIG. 3 is a view of the device from FIG. 1 in axial section after adjustment.

Referring to FIGS. 1 to 3, the end of a drive shaft 21 leaving a bearing 27 and reciprocating in rotation is adapted to drive reciprocating rotation of a drive unit 28 to which a windshield wiper arm (not shown) is pivoted.

The drive unit 28 includes a hollow cylinder 34; in the present context a hollow cylinder means some kind of sleeve or ferrule; one axial end of the hollow cylinder 34 bears axially against a hub 40, being centered by an annular bearing surface 53 on the hub 40, fitted over the shaft 21 until it abuts axially against a bearing surface 25 on the shaft 21, for example a conical bearing surface; longitudinal splines 51 are formed in the outside wall of the end portion of the shaft 21, between the latter and the bearing surface 25; the inside bore by means of which the hub 40 is mounted on the end of the shaft 21 is provided with longitudinal splines 52 cooperating with longitudinal splines 51 formed on the outside surface of the end of said shaft centering the hub 40 which in turn centers the hollow cylinder 34 by virtue of its bearing surface 53.

As shown here, the bearing surface 25 of the shaft 21 is advantageously provided with splines that extend the splines 51 and that cooperate with corresponding splines of the hub 40 that extend its splines 52 in a similar manner.

The end of the shaft 21 is hollow; it is provided with a screwthread 57 which opens to the exterior via a smooth bore 58 axially forward of the bearing surface 25; the diameter of the smooth bore 58 is greater than that of the screwthread 57 and its outlet end is flared.

The screwthread 57 is adapted to receive a complementary screwthread 60 on the outside periphery of the end of the shank 62 of a retaining screw 61 having a head 63 with a polygonal recess 65 for turning the screw 61.

The head 63 of the screw 61 is in the form of a flange and its rear face 66 is adapted to cooperate with a retaining washer 70 in turn adapted to cooperate with the front face 35 of the hollow cylinder 34; when the screw 61 is tightened in the shaft 21 the retaining washer 70 is at an axial distance from the end of the shaft 21 and the hollow cylinder 34 is therefore pressed onto the hub 40 which in turn bears axially on the shaft 21.

The front face 35 of the hollow cylinder 34 is advantageously flanked by an annular rim 59 to center the retaining washer 70 via its outside periphery; the retaining washer 70 supports and centers the retaining screw 61 which has a cylinder bearing surface 67 having a diameter less than that of the head 63 but greater than that of the shank 62 and with which the central bore 73 in the retaining washer 70 cooperates.

The radial gap between the end of the shaft 21 and the hollow cylinder 34 accommodates a device for adjusting the relative angular position of the hollow cylinder 34 and the shaft 21.

Longitudinal splines 81 formed on the inside surface of an annular ring 80 are interleaved with the longitudinal splines 51 on the shaft 21. The outside periphery of the ring 80 carries teeth 82 with helical flanks 83, 84 and a broad pitch adapted to cooperate with respective corresponding helical flanks 38, 39 of splines 36 formed on the inside surface of the hollow cylinder 34.

The portions of the inside surface of the hollow cylinder 34 between the splines 36 carry a narrow pitch helical screwthread 29 that cooperates with the corresponding outside screwthread 56 of an annular drive screw 55 coupled in translation to the ring 80 by a heel-piece 94 housed in an annular groove 85 on the ring 80.

In the embodiment shown, the groove 85 is cut annularly; it could be formed by front and rear transverse abutments offset successively and circumferentially, of course, for example to facilitate manufacture of the ring 80 by a molding process.

Figure 4:
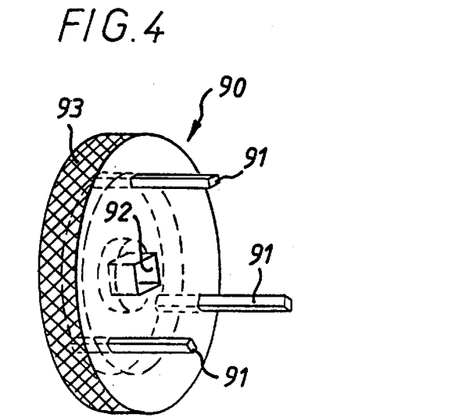
FIG. 4 is a perspective view of an adjuster key for adjusting the device of FIGS. 1 to 3.

From the foregoing description it is evident that the angular displacement of the drive unit 28 relative to the shaft 21 is obtained by turning the annular drive screw 55; to this end the latter has at the front one or more radial notches 95, for example three radial notches 95 at 120°, adapted to receive the ends of adjuster pins 91 of an adjuster key 90 (see FIG. 4) consisting of a disk 93 to which the pins 91 are perpendicular and which has at its center a square hole 92 adapted to receive the square end of an operating tool, if necessary; as shown in chain-dotted line in FIG. 3, correct positioning of the key 90, in particular of the ends of the pins 91 in the notches 95, is facilitated by the fact that the head 63 of the screw 61 has a cylindrical peripheral surface the diameter of which is such that it is inscribed perfectly in the volume encompassed by the adjuster pins 91 and, when the latter are in line with the head 63 parallel to its axis, they are radially in line with the notches 95; the retaining washer 70 naturally has openings 74 at 120° for the adjuster pins 91 to pass through.

To facilitate mounting of the drive unit 28 on the shaft 21, the annular ring 80 and its annular drive screw 55 having been installed inside the hollow cylinder 34, the ring 80 being in a median axial position relative to the splines 36, as shown in FIG. 1, the hub 40, the washer 70 and the screw 61 are fitted and held in place by an elastic axial bracket 96, made of plastics material, for example, urging the hub 40 and the head 63 of the screw 60 on which its bears towards each other in the axial direction; the head 63 positions it transversely in two perpendicular planes. A passage 97 in the bracket 96 enables the resulting assembly to be threaded onto the shaft 21. This provides an assembly ready to be mounted on the shaft 21, the screwthread 60 showing on the inside of the bracket 96 and providing a lead-in for mounting the assembly on the shaft 21.

To this end, it is easy to thread the splines 52 of the hub 40 onto those 51 of the shaft 21, by pivoting the drive unit 28; then, after orienting the wiper-holder arm, and therefore the drive unit 28, as close as possible to its intended end of travel position on the windshield, the assembly is pushed towards the right, as seen in FIG. 1, and the retaining screw 61 is tightened by passing the tightening tool through a passage 98 in the bracket 96; the screw 61 is then loosened, for example by one quarter-turn, to release the retaining washer 70.

The bracket 96 is removed, a slot 99 opening into the passage 97 enabling this; the width of the slot 99 is advantageously less than the diameter of the shaft 21 to prevent it falling off accidentally.

Precise adjustment of the position of the drive unit 28 relative to the shaft 21 can be facilitated by ensuring that during the adjustment the drive unit 28 turns in the same direction as that in which the adjuster key 90 is turned; to achieve this, all that is required is that the pitch of the helical flanks 38, 39–83, 84 for the ring 80 be in the opposite direction to that of the threads 29–56 for the annular screw 55.

The screw 61 is then tightened; the washer 70 has some elasticity; it can be slightly conical at rest and plane after clamping; in this case, the bearing surface 35 is plane; of course, the opposite arrangement is equally feasible, the bearing surface 35 then being conical with a cone angle that corresponds to that of the deformed washer 70 after clamping.

As a safety measure, to prevent the annular screw 55 moving forwardly beyond the face 35 of the hollow cylinder 34 during the adjustment, a transverse abutment 36A limits the axial travel of the annular screw 55; in the embodiments shown in the figures the abutment 36A is the axial bottom of the splines 36 which are blind; as an alternative to this the abutment 36A is dispensed with and it is the thread 29 itself that defines the end of travel of the annular screw 55.

Figure 5:
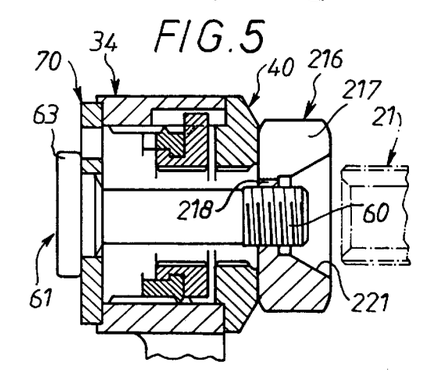
FIG. 5 is a sectional view of the device from FIGS. 1 to 3 pre-assembled in a different way and shown to a smaller scale.

FIG. 5 shows the device from FIGS. 1 to 3 pre-assembled differently, and to a smaller scale; the bracket 96 is replaced by a nut 216 that can be cut easily, for example a nut made from plastics material, mounted on the screwthread 60 of the retaining screw 61; the combination of the retaining washer 70, the hollow cylinder 34 and the hub 40 is therefore maintained axially between the head 63 of the retaining screw 61 and the nut 216; the latter incorporates radial cuts 217, for example three radial cuts distributed circumferentially, forming areas 218 that can be cut easily; the nut 216 has a conical entry 221 so that when the assembly is offered up in front of the shaft 21 and pushed towards the latter the end of said shaft 21 splits the nut 216, into three segments in this example, because of the conical entry 221; all that then remains is to screw in the retaining screw 61.

Figure 6:
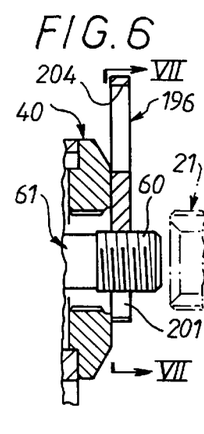
FIG. 6 is a fragmentary sectional view of the device from FIGS. 1 to 3 pre-assembled in a further way and shown to a smaller scale.
Figure 7:
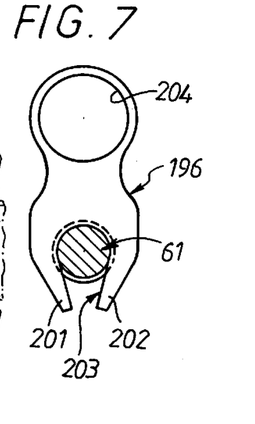
FIG. 7 is a view in section taken along the line VII—VII in FIG. 6.

In FIGS. 6 and 7 pre-assembly is effected by means of a bracket 196, which is a transverse bracket in this example, for example made from plastics material, in the form of a plate having two flanges 201, 202 defining a notch 203 with a circular bottom the diameter of which is equal to the root diameter of the screwthread 60 of the retaining screw 61 and the width of the entry of which is less than said diameter; at the end opposite that having the notch 203, the transverse bracket 196 has holding means, in this example a ring 204; in this way the assembly is held axially between the head of the retaining screw 61 and the transverse bracket 196 clipped to the screwthread 60 of said screw; after inserting the end of the screwthread 60 into the shaft 21, all that remains is to remove the transverse bracket 196 radially, by means of the ring 204, and to screw in the retaining screw 61.

In a variant of the device from FIGS. 1 to 3 that is not shown, the annular ring 80 has helical splines on its inside surface, so that it can be rotationally fastened to said shaft whilst being mobile in the axial direction, and at least one straight-flank or reverse pitch tooth on its outside surface, the hollow cylinder having at least one spline recessed into its inside surface adapted to receive said at least one tooth of the annular ring, the flanks of said spline being straight or of reverse pitch and in corresponding relationship to the straight or reverse pitch flanks of said at least one tooth of the annular ring.

One application of the device in accordance with the invention has been described in which the shaft is a driving shaft; of course, the invention applies equally well to the situation in which the shaft is a driven shaft, as in a different application described next.

An automobile engine includes distributor means that include a drive shaft, i.e. the crankshaft, and driven shafts adapted to drive other units, for example, the camshaft and the drive shaft of a fuel pump such as a diesel injection pump.

The driven shafts are driven by the drive shaft through gears at the ends of the shafts and coupled kinematically or by a chain or a notched belt linking notched pulley-wheels provided at the ends of said shafts.

These driven pulley-wheels and gears must naturally be rigorously positioned or immobilized relative to the drive shaft; incorrect locking of the camshaft impacts on pollution by the engine emission gases, for example, on fuel consumption, on power output and, more generally, on its behavior overall; incorrect locking of the injection pump drive shaft likewise has a similar impact.

Given the large number of component parts included in a distributor system and the manufacturing tolerances for such parts, it is impossible to achieve proper locking by construction.

It can be effected by positioning the various parts using shims and measuring instruments. These methods are time-consuming and therefore costly.

Figure 15:
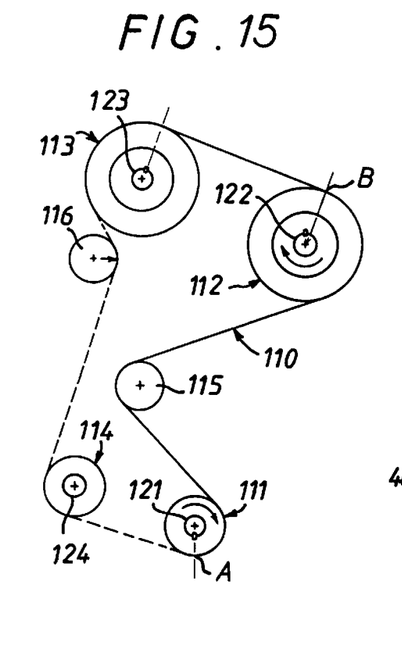
FIG. 15 is a diagram showing a portion of the distributor means of an automobile vehicle engine.

FIG. 15 is a schematic representation of the distributor system of a vehicle engine formed by a belt 110 linking a drive pulley-wheel 111 fastened to a drive shaft 121 to three driven pulley-wheels 112, 113 and 114 respectively fastened to an injection pump shaft 122, a camshaft 123 and an oil pump shaft 124; rollers 115 and 116 tension the belt 110.

Figure 8:
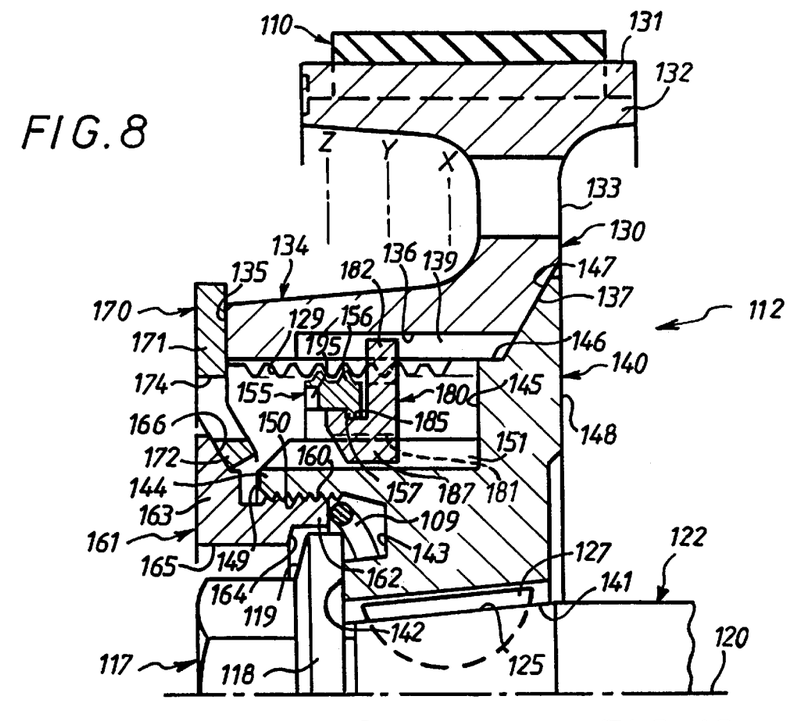
FIG. 8 is a sectional half-view of another device in accordance with the invention.
Figure 9:
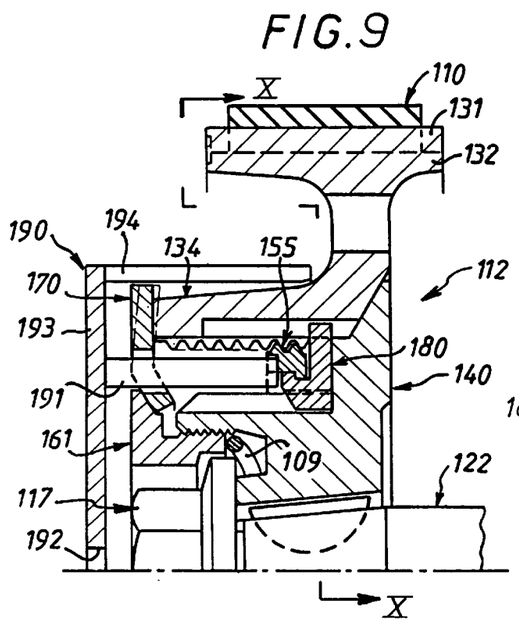
FIG. 9 is a view to a smaller scale similar to that of FIG. 8 in axial section taken along the line IX—IX in FIG. 10, and with an adjuster key in place.
Figure 10:
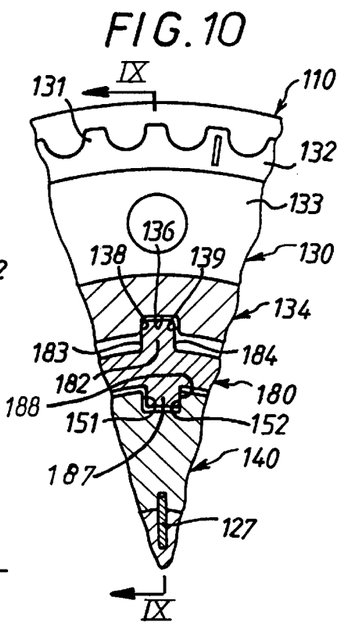
FIG. 10 is a fragmentary view in cross-section taken along the line X—X in FIG. 9.

Referring to FIGS. 8 through 10, the pulley-wheel 112 of the injection pump comprises two coaxial parts, a rim 130 and a hub 140; the rim 130 has at its periphery teeth 131 adapted to cooperate with the notches of the notched belt 110.

The hub 140 has a central conical bore 141 received by a corresponding conical bearing surface 125 on the shaft 122, the conical bore 141 being clamped onto the conical bearing surface 125 by a nut 117 screwed onto the screwthreaded end of the shaft 122, the base 118 of the nut 117 bearing on the front transverse face 142 of the hub 140 flanking the conical bore 141; a key 127 assures angular pre-positioning and rotational fastening between the hub 140 and of the shaft 122.

The transverse face 142 of the hub 140 incorporates an annular recess 143 the larger diameter inside cylindrical surface of which extends axially beyond the transverse face 142 and the base 118 of the nut 117, flanking axially on the same side as the axis 120 of the shaft 122 a skirt 144 whose greater diameter cylindrical outside wall extends axially towards the rear, beyond the recess 143, as far as a transverse wall 145 extended in its upper part by a cylindrical axial rim 146 extended by a conical bearing surface 147; the hub 140 is delimited on the side opposite that with the recess 143 by a rear transverse face 148.

The rim 130 includes a ring 132 with teeth 131 at its outside periphery and an internal radial web 133 connecting the ring 132 to a hollow cylinder 134 coaxial with the axis 120 extending axially relative to the web 133 from the same side as the skirt 144, at a radial distance from said skirt 144, the front transverse end face 135 of the cylinder 134 extending beyond the front transverse end face 149 of the skirt 144.

The rim 130 has at the rear a conical bearing surface 137 complementary to the conical bearing surface 147 on the hub 140 with which it cooperates when the rim 130 and the hub 140 are assembled together, as shown in FIG. 8.

This assembly is effected as follows.

The skirt 144 of the hub 140 has an internal screwthread 150 adapted to receive a complementary screwthread 160 on the outside periphery of the shank 162 of an annular screw 161 having a head 163; the inside bore 165 of the screw 161 surrounds the nut 117 at a distance and is polygonal in shape for turning the screw 161.

The head 163 of the screw 161 is in the form of a flange having an outside diameter greater than the diameter of the shank 162 and is adapted to cooperate with a retaining washer 170 itself adapted to cooperate with the front face 135 of the rim 130. In the example shown the retaining washer 170 has an external part 171 and an internal part 172; the retaining washer 170 is substantially elastic; at rest, its outside part 171 and its inside part 172 are both frustoconical, the concave side of the washer 170 facing the face 135 of the hollow cylinder 134, as shown in chain-dotted line in FIG. 9; to fasten the rim 130 to the hub 140 it is mounted on the hub 140 so that its conical bearing surface 137 cooperates with the conical bearing surface 147 of the hub 140; the washer 170 is fitted, and then the annular screw 161; on tightening the latter, the conical bearing surfaces 137 and 147 are pressed together; the head 163 of the annular screw 161 has a conical face 166 which, on completion of tightening, espouses the shape of the inside part 172 of the washer 170, its outside part 171 deforming until it is perpendicular to the axis 120, so espousing the shape of the front transverse face 135 of the cylinder 134.

The radial gap between the skirt 144 and the hollow cylinder 134 houses a device for adjusting the relative angular position of the rim 130 and the hub 140 and therefore the shaft 122.

The skirt 144 of the hub 140 has on its inside surface longitudinal splines 151 between which are interleaved corresponding longitudinal splines 181 on the inside surface of an annular ring 180 defining lugs 187 between them. At its outside periphery the ring 180 has teeth 182 with helical flanks 183, 184 (see FIG. 10) with a broad pitch adapted to cooperate with respective corresponding helical flanks 138, 139 of splines 136 on the inside surface of the hollow cylinder 134 of the rim 130. The pitches of the helical flanks that cooperate with each other, e.g. 138–183 and 139–184, are advantageously not strictly identical, but very slightly different so that there is a lead angle for the driving piece.

The portions of the inside surface of the hollow cylinder 134 between the splines 136 carry a narrow pitch helical screwthread 129 cooperating with the corresponding outside screwthread 156 of an annular drive screw 155 coupled in translation to the ring 180 by a heel-piece 157 on it accommodated in a groove 185 in the ring 180. The groove 185 is in an axial extension of the ring 180, the annular screw 155 being split to facilitate insertion of the heel-piece 157 into the groove 185.

Three positions of the tooth 182 of the ring 180 are shown in chain-dotted line in FIG. 8: the position X at the start of the adjustment corresponding to the maximum angular lag of the shaft 122, the position Y in the middle of the adjustment corresponding to the theoretical position of a non-adjustable pulley-wheel, and the position Z at the end of the adjustment corresponding to the maximum angular advance of the shaft 122.

For a static adjustment, with the engine stopped, the correct position of the shaft 122 is detected, for example, using a comparator monitoring the angular displacement of the reference point on the shaft relative to a known point, for example the body of a diesel injection pump.

The angular displacement of the shaft 122 is obtained by rotating the annular screw 155 by means of an adjuster key 190 described below to move the ring 180 in translation in the direction X Z until the comparator shows the required value. Any other monitoring means can of course be used to check correct positioning of the shaft, for example bringing two dots or two orifices or two grooves into alignment.

Figure 11:
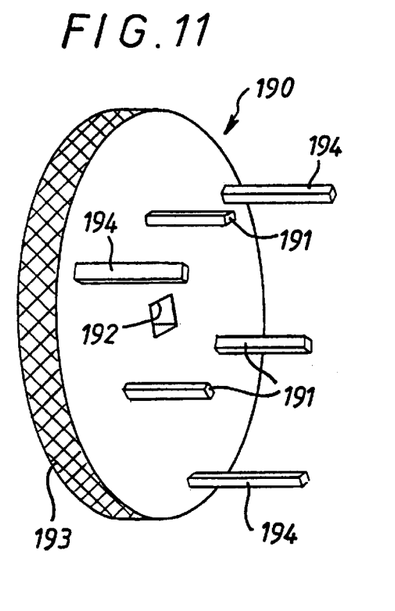
FIG. 11 is a perspective view of an adjuster key for adjusting the device of FIGS. 8 to 10.

Referring to FIG. 11, the adjuster key 190 comprises a disk 193 carrying three adjuster pins 191 adapted to cooperate with the notches 195 of the annular drive screw 155 through the openings 174 of the retaining washer 170; to facilitate the use of the key 170, it also carries three centering pins 194, longer than the adjuster pins 191, adapted to cooperate with the outside periphery of the washer 170, as shown in FIG. 9, to facilitate centering of the key 190 before insertion of the adjuster pins 191. The three centering pins 194 can of course be replaced by a cylindrical skirt.

Throughout the adjustment of the driven shaft the rim 130 must maintain the tension in the tensioned runs of the belt in order not to modify the distance between the point A and the point B (FIG. 15).

The pulley-wheel 112 constitutes a complete drive device assembled with minimum play but not locked by the screw 161 and ready for fitting and adjustment. It is mounted on the shaft by means of its hub 140 which is fastened to the shaft 122 by clamping it thereto using the nut 117.

The rim 130 is immobilized by the belt in the theoretical position, marked relative to the point B. The part of the belt between A and B, known as the taut run, is tensioned to eliminate spread due to the belt.

To rotate the hub 140 clockwise, the ring 180 is placed in position X (FIG. 9), the helical flanks 138, 139 of the rim 130 advantageously having a lefthand thread for reasons explained below.

Of course, the washer 170 is free to rotate during adjustment to minimize the force to be applied to the adjuster key 190 and avoid rotating the screw 161.

Given the tension in the belt 110, the ring 180 and the annular screw 155 offer some resistance to axial displacement on the hub 140. Because the ring 180 moves from X to Z during the adjustment, the rim 130 tends to move from Z to X, due to the thrust of the annular screw 155; accordingly, during the adjustment, the rim 130 is pressed onto the bearing surface 147 of the hub 140, so allowing the washer 170 to rotate freely, with minimum play.

The thread of the annular screw 155 is advantageously a righthand thread and the screw turns anticlockwise: the tension in the taut runs of the belt 110 is therefore maintained; moreover, anticlockwise friction between the annular screw 155 and the ring 180 holds the latter pressed onto the helical flanks 138 of the rim. The ring 180 is then driven clockwise and the flanks 188 of its lugs 187 bear on the flanks 152 of the longitudinal splines 151 of the hub 140 driven clockwise.

By virtue of these provisions, the adjustment successively eliminates play between all the component parts of the pulley-wheel 112:

the annular screw 155, turning anticlockwise, bears on its thread flank 156 which is pressed onto the flank of the thread 129 of the rim. This contact is favored by the pressure in the direction Z X of the adjuster key 190, the ends of the pins 191 of which bear on the bottom of the adjuster notches 195 of the annular screw 155;

the annular screw 155 tending to move away from the ring 180, the front bearing surface on its heel-piece 157 comes into contact with the front bearing surface of the groove 185 in the angular adjustment ring 180 that begins to move from X to Z in the axial direction;

the ring 180, braked by the hub 140 in its movement in translation from X to Z, tends to hold the face 137 of the rim in contact with the face 147 of the hub, via the annular screw 155;

contact between the helical flanks 138 and 183 is maintained by the anticlockwise rotation of the annular screw 155, which also prevents altering of the tension in the belt if the adjustment torque is high;

the ring 180, in addition to its axial displacement, then rotates clockwise, given the direction of the helical flanks 138 and 183, and the flanks 188 of its lugs 187 come to bear on the flanks 152 of the splines 151 on the hub 140.

It is only from this moment, with play and spread eliminated, that the adjustment begins.

As stated above, the pitch of the helical flanks is relatively broad and that of the thread of the annular screw 155 is relatively narrow. For example, if the screwthread has a pitch of 3 and the helical flanks have a pitch of 540, this represents a ratio of 1/180, i.e. 180° angular displacement of the annular screw 155 procures an angular displacement of 1° of the ring 180 and therefore of the shaft 122. This demultiplication effect, despite friction forces, reduces by a factor of around 3 or 4 the force that would have to be applied if the shaft 122 were turned directly. This avoids the need to use rotation assistance that would inevitably degrade the adjustment.

The screw 161 is advantageously braked by a screw brake, for example a coating on its thread or (as shown here) a corrugated split ring 109, so that it does not turn during the adjustment, as it would then to tend to clamp the rim 130 onto the hub 140 and the adjustment would no longer be possible. The brake 109 also defines a minimum adjustment play that can be controlled with great precision, for example: tightening of the screw 161 to approximately 1.5 m.kg, then slackening by 25° to 30°, representing a play of approximately 0.1 mm, allowing the washer 170 to rotate between the bearing face 166 of the screw 161 and the bearing face 135 of the rim 130.

All the pulley-wheels are therefore delivered to the production line with this same adjustment, which cannot vary in transmit because the screw 161 is braked. Of course, the angular ring 180 can be moved to position X bearing on the hub 140, if desired, so extending the assembly and thereby immobilizing the retaining washer 170, the annular screw 155 and the ring 180.

Figures 17, 18, 19:
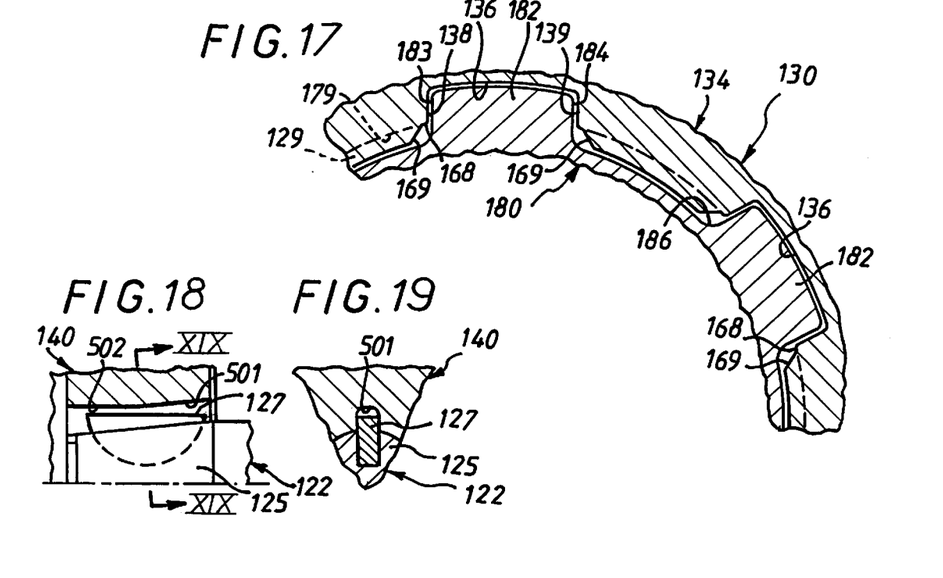
FIG. 17 is a fragmentary view in cross-section of a variant of the device from FIGS. 8 to 10.
FIG. 18 is a fragmentary view in axial section of a variant of the device from FIGS. 8 to 10.
FIG. 19 is a fragmentary view in cross-section taken along the line XIX—XIX in FIG. 18.

It is possible to simplify the machining of the hollow cylinder 134 of the rim 130 and that of the annular ring 180, in particular to avoid the need for deburring after cutting the thread 129 and eliminating the sharp angle at the foot of the teeth 182 of the ring 180 which could constitute a weak point from which cracking could start; referring to FIG. 17, the ends 169 of the threaded areas are at a circumferential distance 168 from the helical flanks 138, 139 of the rim 130, at a radius at least equal to the radius 179 of the thread root; the ends 169 are inclined to the flanks 138, 139 and produce a radius 186 at the foot of the teeth 182; note that this inclination also favors the entry of the thread-cutter into the material and reduces burrs at the exit.

The shank 162 of the retaining screw 161 advantageously has on the same side as the axis 120 a rim defining a bearing surface 164 (FIG. 8) which is slightly conical in this example, with which a corresponding bearing surface 119 on the base 118 of the nut 117 cooperates; accordingly, when the nut 117 is unscrewed it serves as an extractor for the pulley-wheel 112.

The presence of a nut of this kind may impede correct fitting of the pulley-wheel 112 to the shaft 122; to facilitate finding the key slot in the hub 140 blind, as shown in FIGS. 18 and 19, the bottom 502 of the slot is parallel to the axis of the shaft, the key 127 being placed so that its rectilinear edge is parallel to said axis; if it is required for the hub 140 of this pulley-wheel to be also mountable on a shaft in which the edge of the key is parallel to the top generatrix, as seen in FIG. 18, of the conical part 125 of the shaft, all that is required is to provide a slot bottom 502 parallel to the axis of the shaft followed by a slot bottom 501 parallel to said generatrix.

If the annular ring 180 comprises only one tooth 182 and cooperates with one only longitudinal spline 151 of the hub 140, no mounting error is possible when the pulley-wheel is mounted on the shaft 122; if this is not the case, it is advantageous to provide polarizer means; such means are obtained, for example, by making one of the teeth wider or longer than the others or offsetting one tooth relative to the others.

Figure 12:
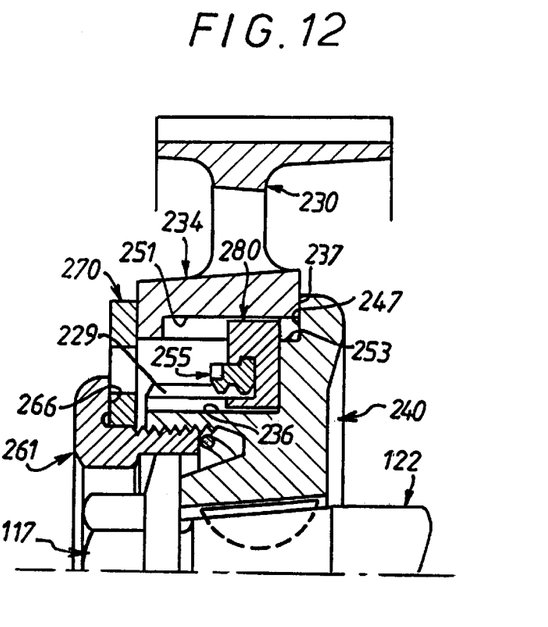
FIG. 12 is a variant of FIG. 9.

In the FIG. 12 variant it is the hollow cylinder 234 of the rim 230 that has internal longitudinal splines 251 while the hub 240 carries the splines 236 with helical flanks and the outside screwthread 229, the annular ring 280 and the annular screw 255 being designed accordingly; the hollow cylinder 234 is centered on a recess 253 of the hub 240 flanked by a bearing surface 247, a transverse bearing surface in this example, with which a transverse bearing surface 237 of the rim 230 cooperates abutment-fashion; in this example the retaining washer 270 is similar to the washer 70 from FIG. 1 and plane after clamping, the annular retaining screw 261 having a transverse application face 266. The drive torque being assured by cooperation of the bearing surfaces 237 and 247, it can be improved by disposing a coating or a washer between the latter to increase the coefficient of friction.

Figures 13, 14:
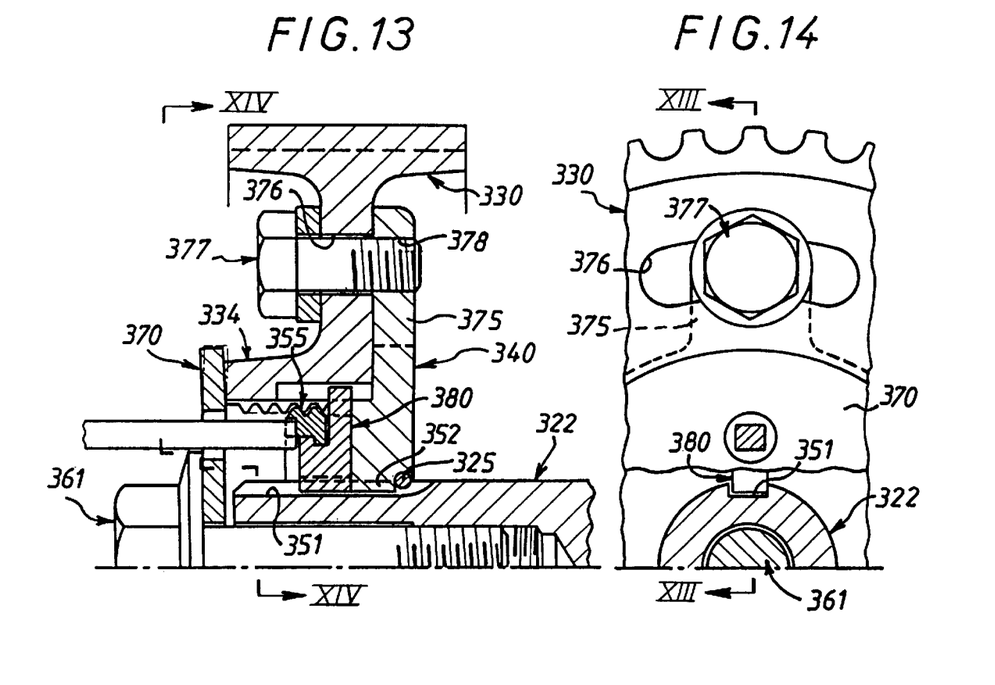
FIG. 13 is a variant of the device from FIGS. 1 to 3, for a different application, in axial section taken along the line XIII—XIII in FIG. 14.
FIG. 14 is a fragmentary view in cross-section taken along the line XIV—XIV in FIG. 13.

In the variant of FIGS. 13 and 14 the arrangement is of the kind described with reference to FIGS. 1 to 3 in the sense that it is the shaft 322, in this example a driven shaft, which carries the annular ring 380, sliding by virtue of a longitudinal spline 351, coupling to the annular drive screw 355, the hub 340 having a longitudinal tooth 352 engaged in the spline 351; a ring 325 provides axial abutment of the hub 340 relative to the shaft 322; in a different variant, the axial abutment is provided by means of a larger diameter portion of the shaft 322, advantageously having an inclined front face.

The retaining screw 361 presses the washer 370 against the hollow cylinder 334 of the rim 330 which is itself pressed against the hub 340; if the pulley transmits a high torque it can be advantageous, as shown in the figures, to provide the hub 340 with at least one radial lug 375 having a thread 378 to receive a screw 377 passing through a circumferential opening 376 in the rim 330; the circumferential extent of the opening 376 is sufficient to enable adjustment of the angular position of the rim 330 relative to the hub 340 and thus relative to the shaft 322; the adjustment is made permanent by using a special screw 377.

Figure 16:
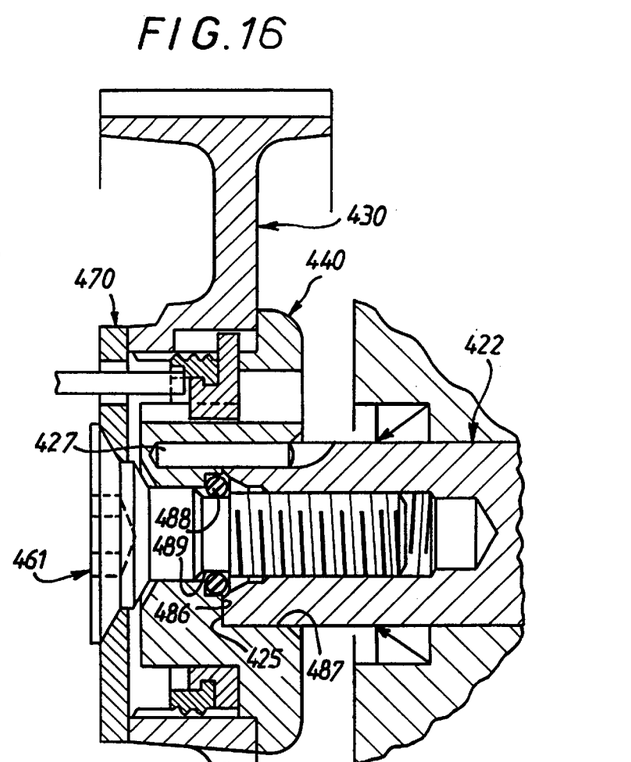
FIG. 16 is a fragmentary view in axial section of another variant of the device of the invention.

In the FIG. 16 variant the hub 440 is mounted on and covers the end of the shaft 422; to be more precise, on the side facing towards the shaft 422 it has a housing with a cylindrical wall 487 matched to the diameter of the end of the shaft 422 and a bottom 486 adapted to abut on the end face 425 of the shaft 422; the hub 440 and the shaft 422 are positioned angularly and constrained to rotate together by an axial key 427 carried by the hub 440; a retaining screw 461 passes through the retaining washer 470 and the bottom of the hub 440 and is screwed into the shaft 422; an elastic split ring 488 is housed in a groove 489 on the screw 461 and retains the screw 461 axially in its exit direction by bearing on an annular recess in the hub 440; the hub 440, the rim 430, the washer 470 and the screw 461 therefore constitute an assembly ready for fitting to the shaft 422.

What is claimed is:
1. A subassembly comprising:
   a coupling device for mounting at an end of a shaft, and comprising
      a hub structured and arranged to be mounted on and axially keyed relative to said shaft;
      a hollow cylinder adapted to surround said shaft;
      an annular ring surrounded by the hollow cylinder and axially movable, said annular ring being structured and arranged, during axial movement, to adjust a relative angular position of the hollow cylinder and the shaft;
      a retaining screw and a retaining washer for locking the hollow cylinder and the shaft in their adjusted relative angular position after the coupling device has been mounted on the shaft by pressing the retaining washer against a front face of the hollow cylinder with the retaining screw, and the hollow cylinder against the hub;
   assembly means for assembling the coupling device, the retaining washer, and the retaining screw as the subassembly, at least prior to mounting of the coupling device on the shaft.

2. The subassembly according to claim 1, wherein the assembly means comprise a bracket.

3. The subassembly according to claim 2, wherein the bracket is axial.

4. The subassembly according to claim 2, wherein the bracket is transversal.

5. The subassembly according to claim 1, wherein the assembly means comprise a nut adapted to be cut easily, and cooperating with the thread of the retaining screw.

6. The subassembly according to claim 1, wherein the annular ring has longitudinal splines on its inside surface for constraining its rotation together with said shaft while being movable axially, and at least one tooth with helical flanks on its outside surface; said hollow cylinder having at least one spline recessed into its inside surface and adapted to receive said at least one tooth of the annular ring; said spline having flanks which are helical and in corresponding relationship with the helical flanks of said at least one tooth of the annular ring.

7. The subassembly according to claim 1, wherein the annular ring has helical splines on its inside surface for constraining its rotation together with said shaft while being movable axially, and at least one tooth with straight or reverse pitch flanks on its outside surface; said hollow cylinder having at least one spline recessed into its inside surface adapted to receive said at least one tooth of the annular ring; said spline having flanks which are straight or of reverse pitch and in corresponding relationship with the straight or reverse pitch flanks of said at least one tooth of the annular ring.

8. The subassembly according to claim 1, wherein the assembly means comprise the retaining screw.

9. The subassembly according to claim 8, wherein the retaining screw is annular and has a shank with a screwthread adapted to cooperate with a complementary screwthread on the inside of a skirt of the hub, and a head in the form of a flange adapted to cooperate with the retaining washer.

10. The subassembly according to claim 8, further comprising an elastic ring housed in a groove in the retaining screw, said elastic ring bearing on an annular recess in the hub.

11. The subassembly according to claim 1, wherein the annular ring has on one of its inside and outside surface, longitudinal splines and, on the other of its inside and outside surface, at least one tooth with helical flanks; at least one of said hollow cylinder and said hub having at least one spline adapted to receive said at least one tooth of the annular ring; said spline having flanks which are helical and in corresponding relationship with the helical flanks of said at least one tooth of the annular ring; said longitudinal splines enabling the annular ring to be mounted on said at least one of the hollow cylinder and the hub, which does not include said at least one spline but instead longitudinal splines complementary with the longitudinal splines of the annular ring.

12. The subassembly according to claim 11, wherein said at least one tooth comprises a plurality of teeth with helical flanks, the subassembly further comprising polarizer means for correctly mounting the coupling device on the shaft.

13. The subassembly according to claim 1, wherein the retaining washer is slightly conical when at rest and plane after clamping.

14. The subassembly according to claim 1, wherein the retaining washer is plane when at rest, and slightly conical after clamping; said hollow cylinder having a front face which is also slightly conical.

15. The subassembly according to claim 1, wherein the retaining washer has at least one opening for an adjuster tool.

16. The subassembly according to claim 1, wherein the hub has at least one radial lug with a thread to receive a screw passing through a circumferential opening in a rim adapted to be pressed against the hub.

17. Shaft fitted at one of its ends with the coupling device that is part of the subassembly as claimed in claim 1, the hub of the coupling device being keyed to the shaft in a predetermined annular position to rotate therewith.

18. The shaft according to claim 17, wherein the hub is locked by a bearing surface of the shaft, said bearing surface having splines that extend splines of the shaft and cooperate with corresponding splines of the hub.

19. The shaft according to claim 17, wherein the hub is mounted on a conical part of the shaft by a key having an edge which is parallel to a generatrix of said conical part; the hub including a key slot having a bottom, and the bottom of the key slot having a first part parallel to the axis of the shaft followed by a second part parallel to said generatrix.

20. Windshield wiper arm including a drive member coupled to the end of the shaft, the drive member is carried by the hollow cylinder of the subassembly as claimed in claim 1.

21. Pulley-wheel having a rim coupled to the end of the shaft, wherein said rim is carried by the hollow cylinder of the subassembly according to claim 1.

22. The pulley-wheel according to claim 21, wherein the subassembly further comprises for the axial displacement of the annular ring, an annular drive screw carrying a helical thread which cooperates with a helical thread on a surface without splines of either the hollow cylinder or the hub, that carries there at least one spline, said annular ring being coupled in translation into said annular drive screw, and wherein the hollow cylinder has helical flanks which have a lefthand thread, and the screwthread of the annular drive screw has a righthand thread.

23. A subassembly comprising:
a coupling device for mounting at an end of a shaft, and comprising
a hub structured and arranged to be mounted on and axially keyed relative to said shaft;
a hollow cylinder adapted to surround said shaft;
an annular ring surrounded by the hollow cylinder and axially movable, said annular ring being structured and arranged, during axial movement, to adjust a relative angular position of the hollow cylinder and the shaft;
a retaining screw and a retaining washer for locking the hollow cylinder and the shaft in their adjusted relative angular position after the coupling device has been mounted on the shaft by pressing the retaining washer against a front face of the hollow cylinder with the retaining screw, and the hollow cylinder against the hub;
assembly means for assembling the coupling device and the retaining washer as the subassembly at least prior to mounting of the coupling device on the shaft;
the subassembly further comprising for the axial displacement of the annular ring, an annular drive screw carrying a helical thread which cooperates with a helical thread on a surface without splines of either the hollow cylinder or the hub, that carries there at least one spline, said annular ring being coupled in translation into said annular drive screw.

24. The subassembly according to claim 23, further comprising a transverse abutment which limits the axial travel of the annular drive screw.

25. The subassembly according to claim 23, wherein the annular drive screw is not strictly circular when at rest.

26. The subassembly according to claim 23, wherein the annular drive screw is slit and its thread is a single thread starting from one side of said slit and ending at the other side.

27. The subassembly according to claim 23, wherein ends of threaded areas are circumferentially in line with or at a distance from helical flanks of a rim adapted to be pressed against the hub and being on a radius at least equal to the radius of a thread root.

28. The subassembly according to claim 27, wherein the ends are inclined to said flanks.

* * * * *